United States Patent [19]
Kim

[11] Patent Number: 5,821,723
[45] Date of Patent: Oct. 13, 1998

[54] SPEED CONTROL APPARATUS FOR A SWITCHED RELUCTANCE MOTOR

[75] Inventor: Ki-Bong Kim, Suwon, Rep. of Korea

[73] Assignee: Samsung Electronics Co., Ltd., Suwon, Rep. of Korea

[21] Appl. No.: 912,990

[22] Filed: Aug. 12, 1997

[30] Foreign Application Priority Data

Nov. 4, 1996 [KR] Rep. of Korea .................. 1996-51767

[51] Int. Cl.⁶ ....................................................... H02P 7/00
[52] U.S. Cl. ............................................. 318/701; 318/254
[58] Field of Search .................................... 318/701, 254, 318/439, 685, 696, 138

[56] References Cited

U.S. PATENT DOCUMENTS

| | | | |
|---|---|---|---|
| 3,643,140 | 2/1972 | Allison | 318/138 |
| 3,663,877 | 5/1972 | Clark | 318/254 |
| 4,297,626 | 10/1981 | Chiang | 318/696 |
| 4,353,016 | 10/1982 | Born | 318/254 |
| 4,584,506 | 4/1986 | Kaszmann | 318/254 |
| 4,584,512 | 4/1986 | Pritchard | 318/696 |
| 5,689,164 | 11/1997 | Hoft et al. | 318/701 |

*Primary Examiner*—Jonathan Wysocki
*Attorney, Agent, or Firm*—Burns, Doane, Swecker & Mathis, L.L.P.

[57] ABSTRACT

This invention provides a switched reluctance motor SRM speed control apparatus capable of accurately adjusting an amount of current flowing in a stator coil even at higher speed, thereby accomplishing higher speed control of the SRM, this preferably being accomplished by generating a resonant frequency corresponding to motor speed specified by a user, controlling, in a phase controlling stage, phase of a commercial AC voltage incoming from the external source with reference to the resonant frequency signal to adjust average voltage level, and increasing or decreasing the amount of current in the stator coil.

4 Claims, 6 Drawing Sheets

SPEED CONTROL APPARATUS FOR A SWITCHED RELUCTANCE MOTOR

BACKGROUND OF THE INVENTION

FIELD OF THE INVENTION

The present invention relates to a SRM (Switched Reluctance Motor) and, more particularly to a SRM speed control apparatus suitable for higher speed control of the SRM.

DESCRIPTION OF THE PRIOR ART

Generally, as shown in FIG. 1, a switched reluctance motor (SRM) has stator 2 and rotor 4, the stator 2 having A-, B- and C-phase coils 6, 8, 10 wound on A- and −A-pole, B- and −B-pole, and C- and −C-pole, respectively.

As shown in FIG. 2, a driving circuit for such a configured SRM is formed of capacitor C for providing a direct voltage, first to sixth switching elements Q1 to Q6 for applying electric current to the respective phase coils 6, 8, 10, and 6 diodes D1 to D6 for feedback of back electromotive force created when the switching elements Q1 to Q6 are turned off after electric current is applied to each phase coil 6, 8, 10.

Also, a conventional SRM speed control apparatus controlling the driving circuit consists of a signal controlling stage 12 and a pulse width modulation stage 14, as shown in FIG. 3.

For the SRM speed control apparatus as shown in FIG. 3, the signal controlling stage 12 generates a frequency control signal, a pulse width control signal, and a duty-cycle control signal, the frequency control signal corresponding to a rotor positional signal applied from the A-phase position sensor (not shown), or A-phase position signal. The pulse width modulation stage 14 generates a chopping signal whose pulse width is modulated in response to three control signals output from the signal controlling stage 12, and applies it to gate terminal of the switching element Q1, also applies the A-phase position signal to gate of the switching element Q2.

An alternative example for a conventional speed control apparatus intended to generate a chopping signal for purpose of controlling of the SRM speed as described above is shown in FIG. 4. Further prior art uses a microprocessor 16 which receives A-phase position signals incoming from A-phase position sensor, speed detection sensor, and torque sensor (all of which are not shown) and generates a chopping signal whose pulse width is modulated with frequency, pulse width and duty-cycle known from the received signals to apply it to gate of the switching element Q1, also applies A-phase position signal to gate of the switching element Q2.

Meanwhile, if the chopping signal from the pulse width modulation stage 14 and A-phase position signal are applied to the respective switching elements Q1, Q2, these elements Q1, Q2 are switched in response thereto, thereby power being supplied to A-phase coil 6. At this time, current and voltage flowing in the A-phase coil 6 take wave-shapes as shown in FIG. 5.

The switching element Q1 is switched in response to the chopping signal during the turning-on of the switching element Q2 by the A-phase position signal, which allows the chopping of electric current waveform flowing in the A-phase coil 6, resulting in the restriction of increase in current and thus regulation of current amount in the A-phase coil 6.

The +A and −A poles of the stator 2 on which the A-phase coil is wound generate magnetic force corresponding to the regulated amount of current IA by the chopping of the current waveform as described above, and rotate the rotor 4 by attracting magnetic pole of the rotor 4 adjacent the +A- and −A-poles of the stator 2, followed by the switching operations of the switching elements Q3 to Q6 according to the respective positional signals of B- and C-phases associated with the rotor 4, which correspond to the respective phases. Then, the switching operations apply the chopped currents to the B- and C-phases 8, 10, which causes generation of the magnetic force corresponding to current amounts of the chopped waveforms in order of the phases of A, B and then C, resulting in the continuous spinning of the rotor 4.

At this time, based upon the fact that the spinning speed of the rotor 4 depends upon intensity of the generated magnetic force, the SRM speed control may be made by increasing or decreasing in electric current amount flowing into the respective phase coils 6, 8, 10 through the adjustment of the frequency, pulse width and duty cycle of the chopped signal in compliance with desired SRM motor speed.

However, if the SRM is rotated at high speed (e.g., 3000 r.p.m), the periods of the rotor positional signals, which are generated from the position sensors for each phase, become extremely short, This causes the pulse width modulation stage 14 to generate a chopping signal whose frequency exceeds the switching speeds of the switching elements Q1, Q3, Q5, so that the switching cannot promptly be performed in response to the chopped signal having higher frequency. Thus, the problem occurs in that an inaccurate adjustment of current amount in each phase coil of the stator 2 results in a worse control of the motor speed.

SUMMARY OF THE INVENTION

Therefore, it is an object of the present invention to provide a switched reluctance motor SRM speed control apparatus capable of performing higher speed control of the SRM by adjusting an amount of current applied to coil in a driving circuit for the SRM, this preferably being accomplished by phase control of a commercial AC voltage incoming from an external, in compliance with the SRM speed as a user desires.

The above objects are accomplished by a speed control apparatus for a switched reluctance motor SRM providing a rotational force depending upon voltage and current from an external source applied to stator coil by the switching of a driving circuit, the apparatus comprising: a resonant frequency generating stage for generating a resonant frequency signal corresponding to motor speed specified by a user; a phase controlling stage for controlling a phase of a commercial AC voltage incoming from the external source with reference to the resonant frequency signal to adjust average voltage level; and a rectifying stage for rectifying the AC voltage whose average voltage level is controlled and for applying it to the driving circuit.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

The preferred embodiment according to the present invention will now be described in detail in accordance with the accompanying drawings.

Figure 6:
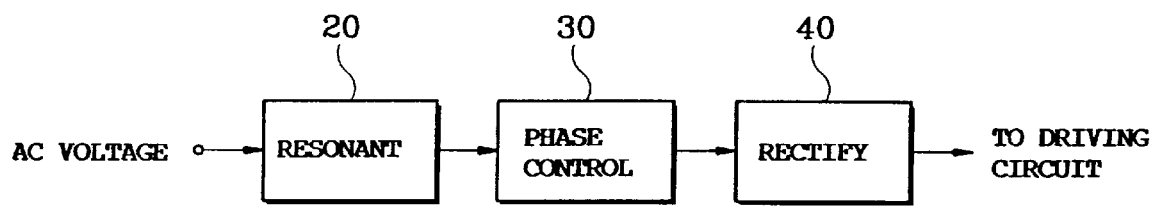
FIG. 6 is a schematic block diagram of a SRM speed control apparatus in accordance with a preferred embodiment of the present invention.

As shown in FIG. 6, a speed control apparatus for a switched reluctance motor SRM includes a resonant frequency generating stage 20, a phase controlling stage 30, and a rectifying stage 40.

In the drawing, the resonant frequency generating stage 20 receives a commercial AC voltage supplied from the external, and generates a pulse signal having a resonant frequency. The phase controlling stage 30 controls the phase of the commercial AC voltage based upon the pulse signal from the resonant frequency generating stage 20.

The rectifying stage 4 fully rectifies the AC voltage whose phase is controlled by the phase controlling stage 30 to obtain a DC voltage, and then provides it a driving circuit for the SRM.

Figure 7:
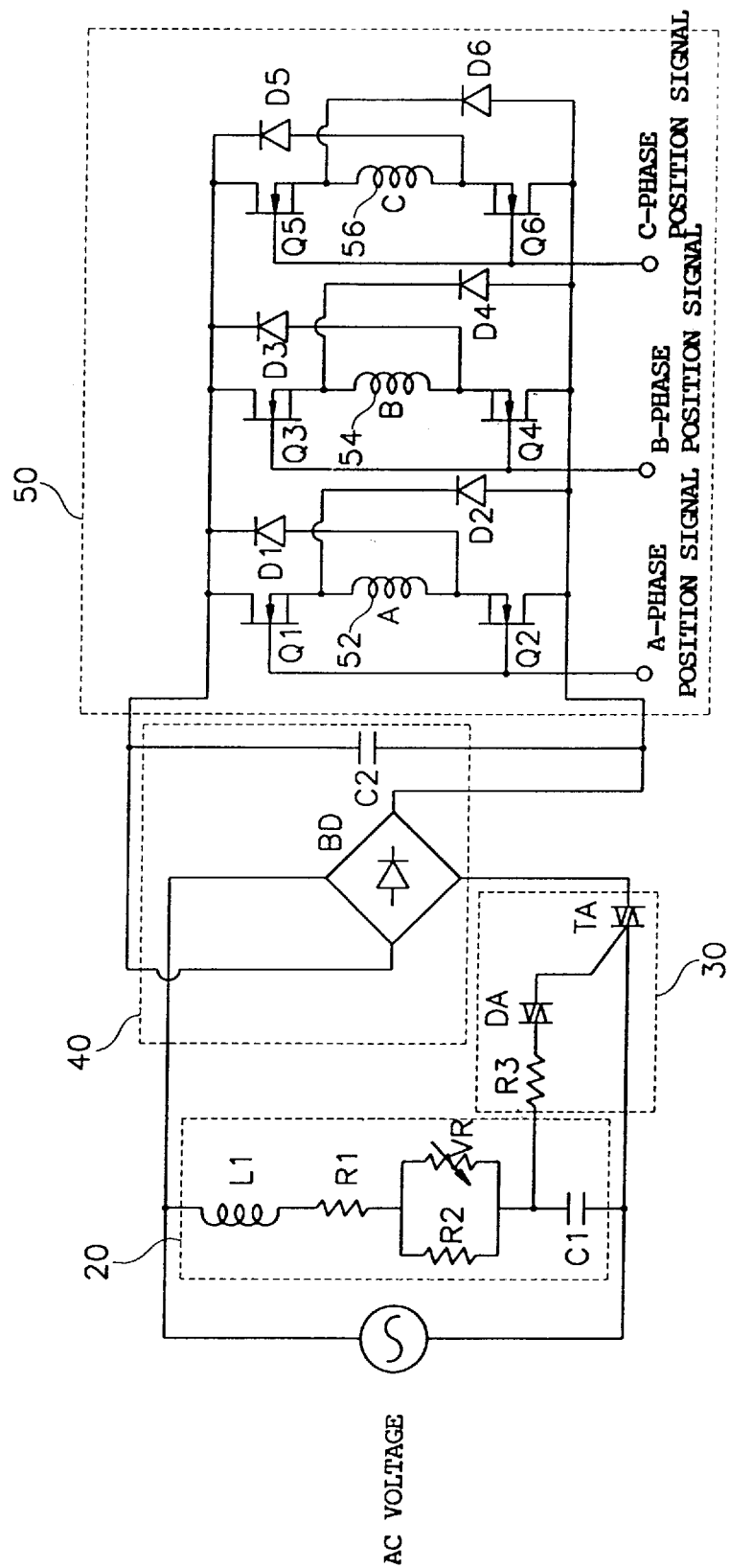
FIG. 7 is a driving circuit for the SRM to which the present invention is applied.
Figure 8:
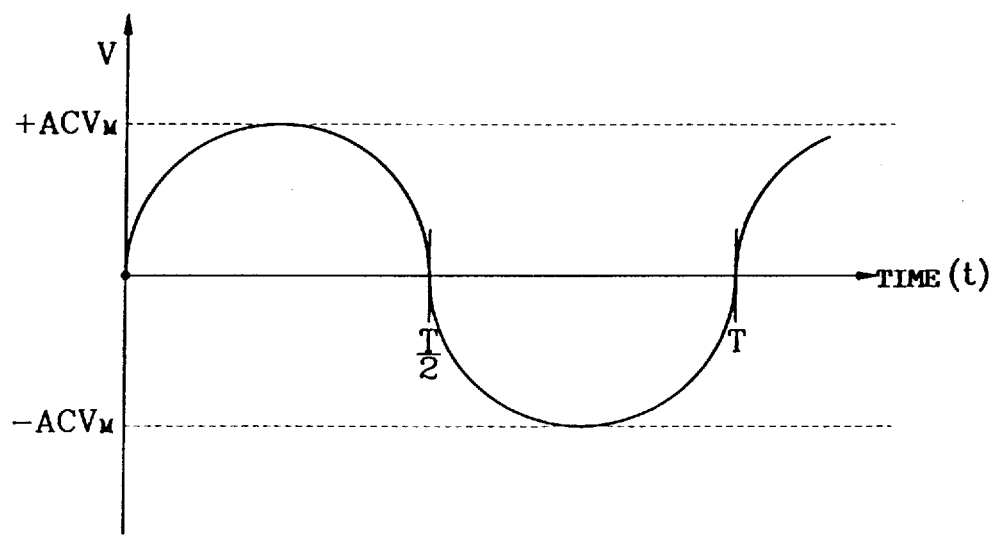
FIG. 8 is a waveform representing a general commercial AC voltage.

FIG. 7 is a detailed circuit diagram of the SRM to which the present invention is applied. As shown in FIG. 7, the resonant frequency generating stage 20 includes a reactance L1, resistor R1, a variable resistor Vr, a resistor R1 coupled to the resistor Vr in parallel, a capacitor C, which all components form an RLC-series resonant circuit. In case an external commercial AC voltage is applied to the circuit, the circuit generates, in response thereto, pulse voltage having a resonant frequency, which may be expressed in the following equation (1);

$$fo = \frac{1}{2\pi\sqrt{LC}} \quad (1)$$

where, f0 denotes resonant frequency, L inductance, and C capacitance.

The phase controlling stage 30 consists of a resistor R3, a diac DA and a triac TA, where the diac DA is operated to generate trigger pulses when the pulse voltage of frequency f0, with its voltage level dropped due to the resistor R3, is input to the stage 30, and the triac TA is switched each time the trigger pluses are input thereto, thereby controlling phase of the AC voltage.

The rectifying stage 40 consists of a bridge diode BD and a smoothing capacitor C2, in which the bridge diode BD is used to full-wave rectify the commercial AC voltage whose phase is controlled by the triac TA, and the smoothing capacitor C2 is used to remove ripple components contained in the rectified DC voltage for applying it the driving circuit 50.

The driving circuit 50 includes 6 switching elements Q1 to Q6 for applying the rectified DC voltage to each of phase coils 52, 54, 56, with reference to the rotor position signal of each phase input from the position sensor, and 6 diodes D1 to D6 for feedback of back EMF created when the respective switching elements Q1 to Q6 are turned off after applying the rectified voltage to each of phase coils 52, 54, 54.

The operation of the circuit shown in FIG. 7 will be described below with reference to FIGS. 6 to 10.

When a user adjusts the variable resistor VR of the resonant frequency generating stage 20 to obtain a motor speed as the user desires during the supplying of a commercial AC voltage from source to the resonant frequency generating stage 20, an inductance L in the resonance frequency generating stage 20 is varied accordingly. Association of varied inductance L and capacitance of the capacitor C1 causes the stage 20 to generate a signal having a resonant frequency f0 in the equation (1) as mentioned earlier.

More specifically, the capacitor C1 charges the AC voltage whose level is lowered by three resistors R1, R2, VR and reactance L1 therein, and then is discharged every one period of the resonant frequency f0, so that results in pulse-shaped signal of frequency f0. The obtained pulse signal has the level lowered by the resistor R3, whereby lowered voltage is then applied to the diac DA.

Figure 9:
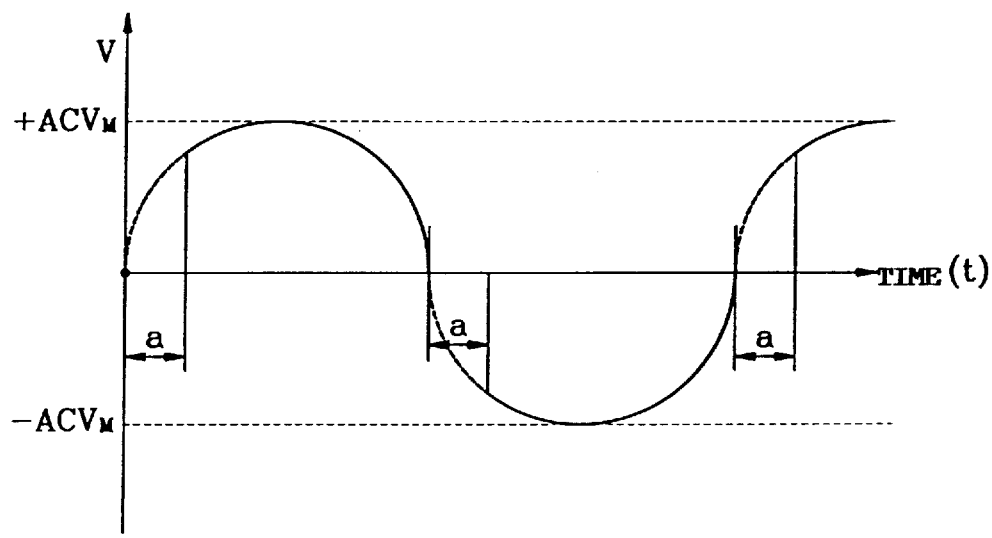
FIG. 9 is a waveform representing the phase-controlled AC voltage by the phase controlling stage in FIG. 7.

The diac DA is switched in response to the pulse signal, generating trigger pulses of frequency f0 to be applied to the triac TA. Then, the triac TA is switched in response to the trigger pulses, which is to control the phase of the AC voltage (see FIG. 8) from source, as shown in FIG. 9. The phase-controlled AC voltage is finally supplied to the rectifying stage 40.

Since the phase-controlled AC voltage has a null level over time period 'a' as denoted in FIG. 9, where a represents phase control angle, an average voltage level ACVave is lowered, which is expressed as follows:

$$ACVave = \frac{1}{\pi} ACV_M \int_a^\pi \sin\theta d\theta \quad (2)$$

where, ACVave denotes an average voltage level of AC voltage, $ACV_M$ a peak voltage, and a phase control angle.

Subsequently, the AC voltage is full-wave rectified in the rectifying stage 40, with the ripple components being removed by the smoothing capacitor C2, and the rectified DC voltage is then supplied to the driving circuit 50 for the SRM, wherein level of the DC voltage is identical with the average voltage level ACVave (without taking into account lowered amount of the voltage in the rectifying stage 40).

Next, if the DC voltage is applied to the driving circuit 50, the switching elements Q1–Q6 associated with the respective phases starts to be switched in response to the rotor position signals of each phase which is applied to the respective gates of said switching elements Q1–Q6, thereby applying the DC voltage to each of phase coils 52, 54, 54 in order of the A-, B- and then C-phases.

Figure 1:
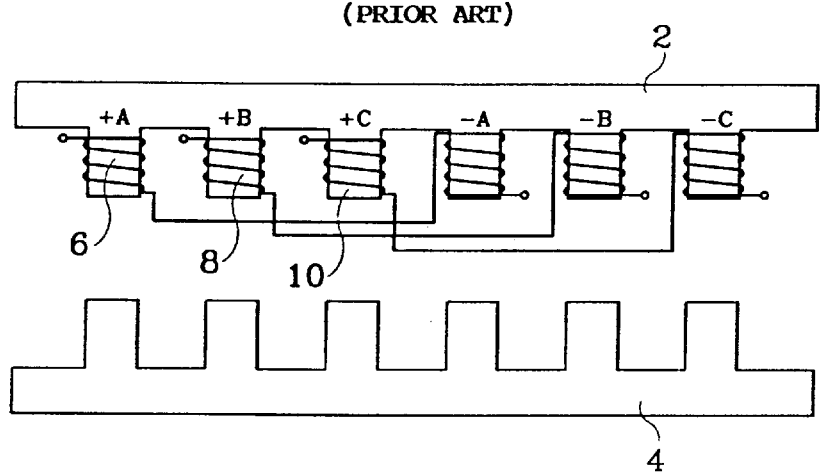
FIG. 1 shows a general construction of a conventional switched reluctance motor SRM.
Figure 2:
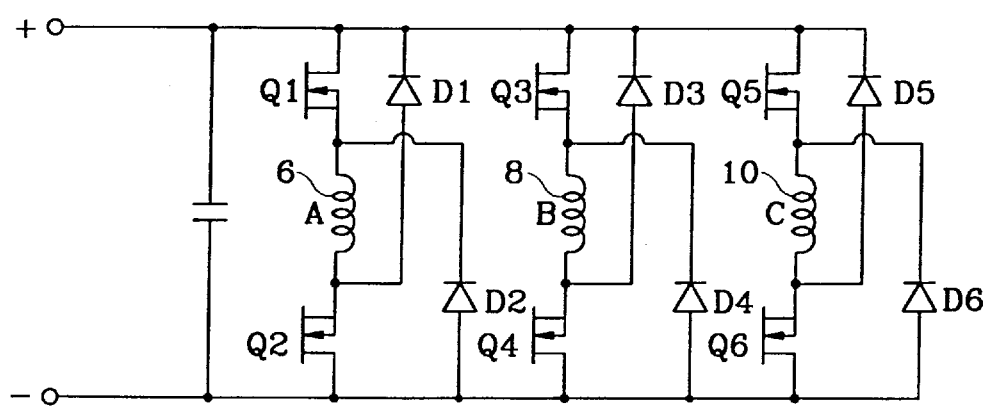
FIG. 2 shows a driving circuit diagram for the conventional SRM.
Figure 3:
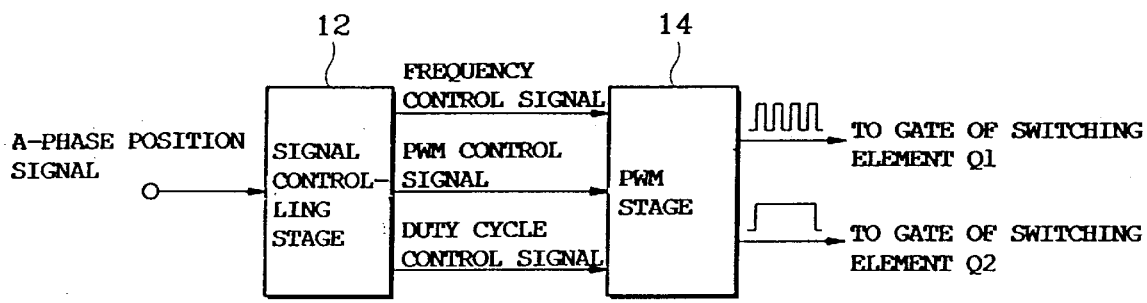
FIG. 3 shows a schematic block diagram of a conventional SRM speed control apparatus.
Figure 4:
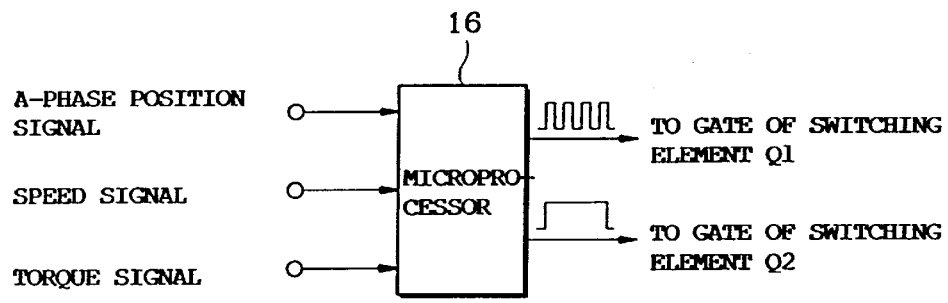
FIG. 4 shows a schematic block diagram of another conventional SRM speed control apparatus.
Figure 5:
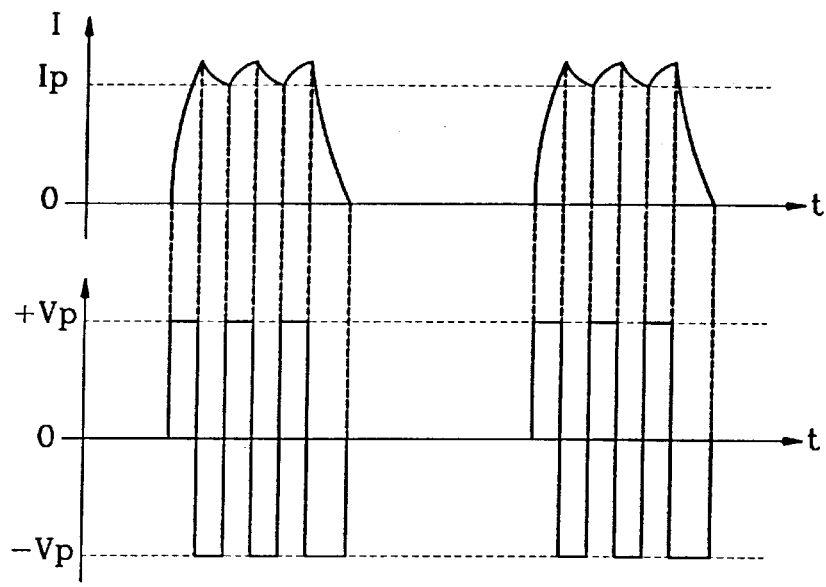
FIG. 5 is a waveform representing the controlled voltage and current in a stator coil, which result from the controlling of the speed control apparatus in FIG. 3 or 4.
Figure 10:
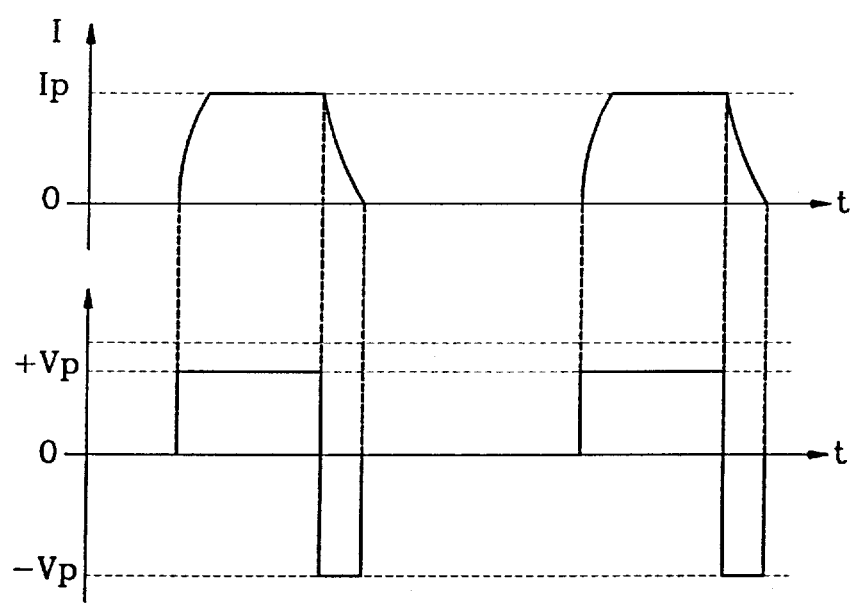
FIG. 10 is waveforms representing current and voltage in a stator coil, controlled by the speed control apparatus according to the present invention.

Waveforms of the voltages and currents applied to each coil of each phase are shown in FIG. 10. Coils 52, 54, 54 create magnetic force of intensity corresponding to the amount of current applied thereto, which can attract magnetic pole of the adjacent rotor (see FIG. 1) to rotate the rotor. At this time, the rotor is rotated at speed corresponding to intensity of the magnetic force generated at coils 52, 54, 56.

The present invention is characterized in that for the purpose of motor speed control, the amount of current in coils 52, 54, 56 is controlled by using the phase-controlled AC voltage, which allows accurate higher speed control of the SRM to be possible, without applying the chopping signal of higher frequency, which exceeds the switching capabilities of the switching elements Q1, Q3, Q5, to the driving circuit 50 as in the prior art.

What is claimed is:

1. A speed control apparatus for a switched reluctance motor SRM providing a rotational force depending upon voltage and current from an external source applied to stator coil by the switching of a driving circuit, the apparatus comprising:

a resonant frequency generating stage for generating a resonant frequency signal corresponding to motor speed specified by a user;

a phase controlling stage for controlling a phase of a commercial AC voltage incoming from the external source with reference to the resonant frequency signal to adjust average voltage level; and a rectifying stage for rectifying the AC voltage whose average voltage level is controlled and for applying it to the driving circuit.

2. The apparatus as defined in claim 1, wherein the resonant frequency generating stage comprises a series resonant circuit consisting of reactance, capacitor and variable resistor for adjusting the resultant resonant frequency.

3. The apparatus as defined in any one of claims 1 and 2, wherein the phase controlling stage comprises: a diac for generating trigger signals in response to the resonant frequency signal generated from the resonant frequency generating stage; and a triac for controlling phase of the AC voltage through the switching of said AC voltage, which is to be supplied to the rectifying stage.

4. The apparatus as defined in any one of claims 1 and 2, wherein the rectifying stage comprises: a bridge diode for full wave rectifying the commercial AC voltage to a corresponding DC voltage; and a capacitor for removing ripple components contained the rectified voltage.

* * * * *